United States Patent

Wade

[11] Patent Number: 5,955,972
[45] Date of Patent: Sep. 21, 1999

[54] GEAR POSITION INDICATOR

[75] Inventor: William G. Wade, 2692 Town Farm Rd., Unity, Me. 04988

[73] Assignee: William G. Wade, Unity, Me.

[21] Appl. No.: 08/922,619

[22] Filed: Sep. 3, 1997

Related U.S. Application Data

[63] Continuation-in-part of application No. 08/533,708, Sep. 26, 1995, Pat. No. 5,859,598.

[51] Int. Cl.$^6$ ................................................ G08B 21/00
[52] U.S. Cl. ........................ 340/960; 340/331; 340/959; 340/679; 73/178 T; 244/100 R; 244/102 R
[58] Field of Search .................................. 340/331, 960, 340/463, 464, 467, 438, 679, 959; 73/178 T; 244/100 R, 102 R, 101

[56] References Cited

U.S. PATENT DOCUMENTS

| | | | |
|---|---|---|---|
| 3,161,852 | 12/1964 | Timm | 340/960 |
| 3,815,262 | 6/1974 | Patterson et al. | 434/35 |
| 3,888,019 | 6/1975 | Trabanino | 434/35 |
| 4,491,824 | 1/1985 | Chiou | 340/467 |
| 4,516,124 | 5/1985 | Shannon et al. | 340/960 |
| 5,139,115 | 8/1992 | Browne et al. | 188/1.11 E |
| 5,313,188 | 5/1994 | Choi et al. | 340/331 |

FOREIGN PATENT DOCUMENTS

| | | |
|---|---|---|
| 470200 | 8/1937 | United Kingdom . |
| 487755 | 6/1938 | United Kingdom . |

OTHER PUBLICATIONS

Donald L. Gibson, "A Simple Wiring Circuit", Sport Aviation, p. 95, Aug., 1995.
Forrest M. Mims, III, "Getting Started in Electronics", 1983.
William Wade, "Landing Gear Indicator System", Hints for Homebuilders, p. 90, Mar., 1995.*
"Direct Current Autosyn Position Indicator", by Pioneer (Pioneer Wheel and Flap Position Indicator), 6 pages, Mar. 5, 1940.

*Primary Examiner*—Benjamin C. Lee
*Attorney, Agent, or Firm*—Choate, Hall & Stewart

[57] ABSTRACT

Disclosed is an apparatus for displaying state and transition state information of mechanical equipment. A sensor and display system is provided for displaying aircraft landing gear status and other mechanism status. In one embodiment, the system utilizes two light emitting diodes (LEDs) for each landing gear leg to display the current position of each gear leg. One yellow LED indicates gear UP and the second green LED shows gear DOWN position. When the control switch is moved to change the position of the gear, the indicator light which had been lit is extinguished, and the indicator for the desired position begins to flash, indicating gear movement. The indicator will continue to flash until the gear leg has reached the limit of travel, at which time the indicator stops flashing and glows steadily. Each gear leg indicator operates independently of the others, so that proper position of each gear leg can be confirmed and any malfunction can immediately be identified. In another embodiment the indicator light glows steadily while mechanical equipment is in a transition state, and the light flashes when the mechanical equipment reaches a desired position.

15 Claims, 7 Drawing Sheets

GEAR POSITION INDICATOR

This application is a continuation in part of commonly owned U.S. patent application Ser. No. 08/533,708 filed Sep. 26, 1995, now U.S. Pat. No. 5,859,598, the teachings of which are incorporated herein by reference.

FIELD OF THE INVENTION

This invention relates to the field of status indicators. More particularly, the invention relates to an apparatus for displaying positional information and/or activation information of mechanical equipment including aircraft landing gear.

BACKGROUND OF THE INVENTION

Sensors of many types are used to determine the position and/or state of all kinds of mechanisms. These sensors are particularly important when the position and/or state of such a mechanism cannot be determined without the aid of a remote sensor. Such a remote sensor must be reliable and must provide information that is readily usable. A sensor that provides reliable and readily usable data is clearly desirable, especially for applications which require high degrees of safety and efficiency.

For example, retractable landing gear used on an aircraft require a remote indicator to show the pilot that the gear are up or down, as the landing gear is normally out of view of the pilot sitting in the cockpit. It is very dangerous to land if one or more gear legs are partially extended, as collapse would almost certainly result. Conversely, if one or more gear were not fully retracted, drag and fuel consumption would be excessive and the aircraft structure could be overly stressed at high speed. Indicator systems currently in use have at most one light per landing gear which illuminates when the gear is fully down, and a warning light to show when there is a problem. Gear retraction is deduced by the position of the landing gear switch and by the extinguished indicator lights.

There are countless aircraft and other applications where it is desirable to provide an indicator system which allows a person to remotely and easily determine the status of certain equipment.

Accordingly, it is an object of the invention to provide status information from a remote location.

Another object of the present invention is to provide position and transition to position information.

A further and more particular object of the invention is to provide an indicator system which displays gear in transit (extension or retraction) information.

Another important object of the invention is to provide an indicator system which displays an indication that the gear have completed their travel to the required limits.

SUMMARY OF THE INVENTION

Among other things, the present invention provides a lightweight, simple, and highly reliable means to show the position of mechanical equipment. In one particular application, the positional status of each aircraft landing gear leg is shown in one of four modes: fully down, retracting, fully up, and extending. It is also a more direct and intuitive display which requires less interpretation by the pilot. This can be an important safety factor given the work load which reaches a peak during takeoff and landing.

The display includes light emitting diodes (LEDs) which correspond to the position of each individual gear leg. Each indicator LED has three states: off, flashing, and steadily on, which indicate specific states of the landing gear. Off indicates that the associated direction of travel has not been selected. On indicates that the associated direction of travel has been selected and the limit of travel has been reached. Flashing shows that a particular direction of travel has been selected but the limit of travel has not been reached. Each gear leg typically has one LED which is used to show the fully up position and another which shows the fully down position when steadily illuminated. The use of different LED colors are used to facilitate distinguishing between the landing gear positions. A yellow LED can be utilized to indicate that the landing gear is in a lock up state or position. A green LED can be utilized to indicate that the landing gear is in a locked down state or position. Only one of the two LEDs is illuminated for each gear leg at any time. When the gear is moving between the extended and retracted positions, the specific indicator will flash until the gear has reached its limit. If one gear does not reach its limit, it will continue to flash while the other indicators glow steadily. This immediately alerts the pilot that a malfunction has occurred, and identifies which gear leg is affected.

In another embodiment, a light source is used to display a transition state and a positional state of a mechanism. The light source is powered by a power source. There is a sensor switch connected between the light source and the power source for directing power to the light source. The sensor switch is in contact with the equipment when the equipment is at the desired positional state. The sensor switch includes a normally open contact and a normally closed contact. A resistor is connected between the normally open contact of sensor switch and the light source; and a flashing diode is connected between the normally closed contact of the sensor switch and the light source. To indicate when the positional state is reached, the mechanism contacts the sensor switch and the sensor switch actuates the normally open contact, routes power to the resistor and causes the light source to illuminate steadily. To indicate the transitional state, the sensor switch actuates the normally closed contact, routes power to the flashing diode and causes the lights source to illuminate intermittently. To reverse the display, such that the light source illuminates intermittently at the positional state and illuminates steadily during the transitional state, the resistor is connected between the normally closed contact and the light source; and the flashing diode is connected between the normally open contact and the light source.

DESCRIPTION OF THE DRAWINGS

The invention will be better understood if reference is made to the accompanying drawings.

DETAILED DESCRIPTION

Figure 1:
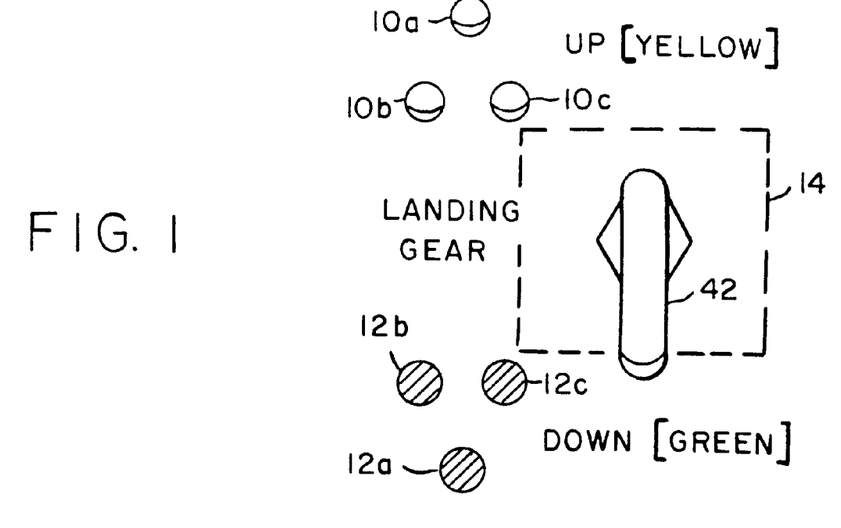
FIG. 1 illustrates a display of the present invention.

FIG. 1 illustrates a display of the invention. Three LEDs 10a, 10b and 10c, one per landing gear element and placed in a configuration to mimic the gear placement on the plane, are used to indicate the "up status" of the gear and are typically a different color as compared to LEDs 12a, 12b and 12c. In the preferred embodiment LEDs 10a, 10b and 10c are yellow in color. Each LED 10a, 10b and 10c can adopt three states, steady emit (on), intermittent emit (blink), or no emit (off), in indicating the "up status." The on state indicates that the gear are fully up. The off state indicates that the up direction is not selected. The blink state indicates that the gear are in transit to fully up.

In addition, three LEDs 12a, 12b and 12c, one per landing gear element and placed in a configuration to mimic the gear placement on the plane, are used to indicate the "down status" of the gear. In the preferred embodiment, LEDs 12a, 12b and 12c are green in color. Each LED 12a, 12b and 12c can adopt three states, steady emit (on), intermittent emit (blink), or no emit (off), in indicating the "down status." The on state indicates that the gear are fully down. The off state indicates that the down direction is not selected. The blink state indicates that the gear are in transit to fully down.

Each landing gear element has a pair of corresponding LEDs, such as the LTL-327G and LTL-327Y sold by Lite-on Inc., located at 720 S. Hillview Dr., Milpitas, Calif. 95035. In the embodiment illustrated by FIG. 1 for a three element landing gear system, LEDs are paired 10a with 12a, 10b with 12b, and 10c with 12c to convey the status of each particular landing gear element. A "conventional" aircraft (taildragger) would normally require sensors and indicators for the two main gear only, and so would have four indicator LEDs for this embodiment of the invention. Switch 14 is utilized to switch the landing gear directions.

Figure 2:
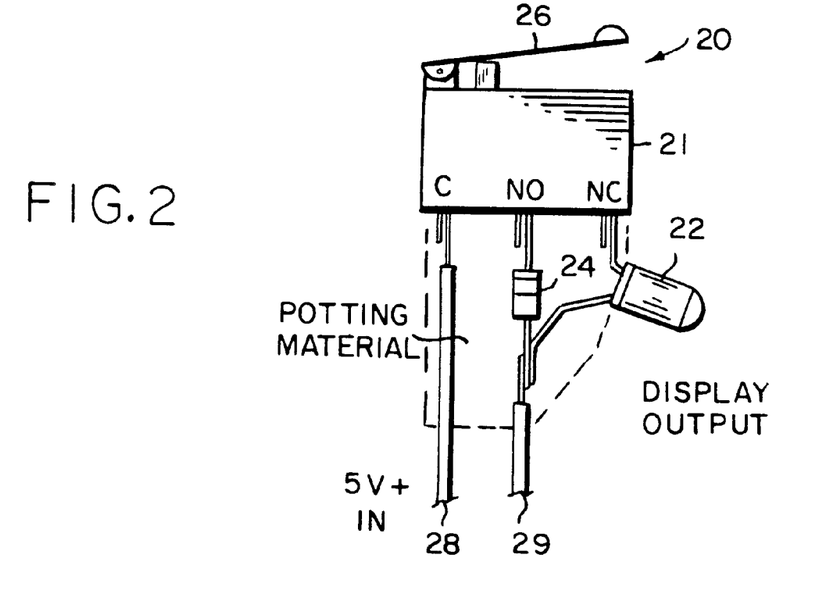
FIG. 2 illustrates an embodiment for a position sensor of the present invention.

FIG. 2 illustrates an embodiment for a sensing element 20 of the invention. Switch 21, having an actuator arm 26, is connected to the display system through leads 28 and 29. Lead 28 supplies the power to the common contact of switch 21. Normally open contact of switch 21 is connected to resistor 24, with normally closed contact of switch 21 connected to flashing LED 22. Flashing LED 22 and resistor 24 are then connected in common to lead 29, which is connected to an LED in the display. When actuator arm 26 of switch 21 is not in the actuated position, switch 21 connects power lead 28 to flashing LED 22. This results in the presence of intermittent power on lead 29, thereby blinking the display LED. When actuator arm 26 is in the actuated position, such as when the landing gear element has reached the end of its travel, switch 21 connects lead 28 to resistor 24. This results in the presence of steady power on lead 29, thereby causing the display LED to be steadily illuminated. The complete assembly can be encapsulated in a potting compound such as epoxy mixed with milled glass fiber in order to reduce mechanical stress and corrosion.

Figure 3:
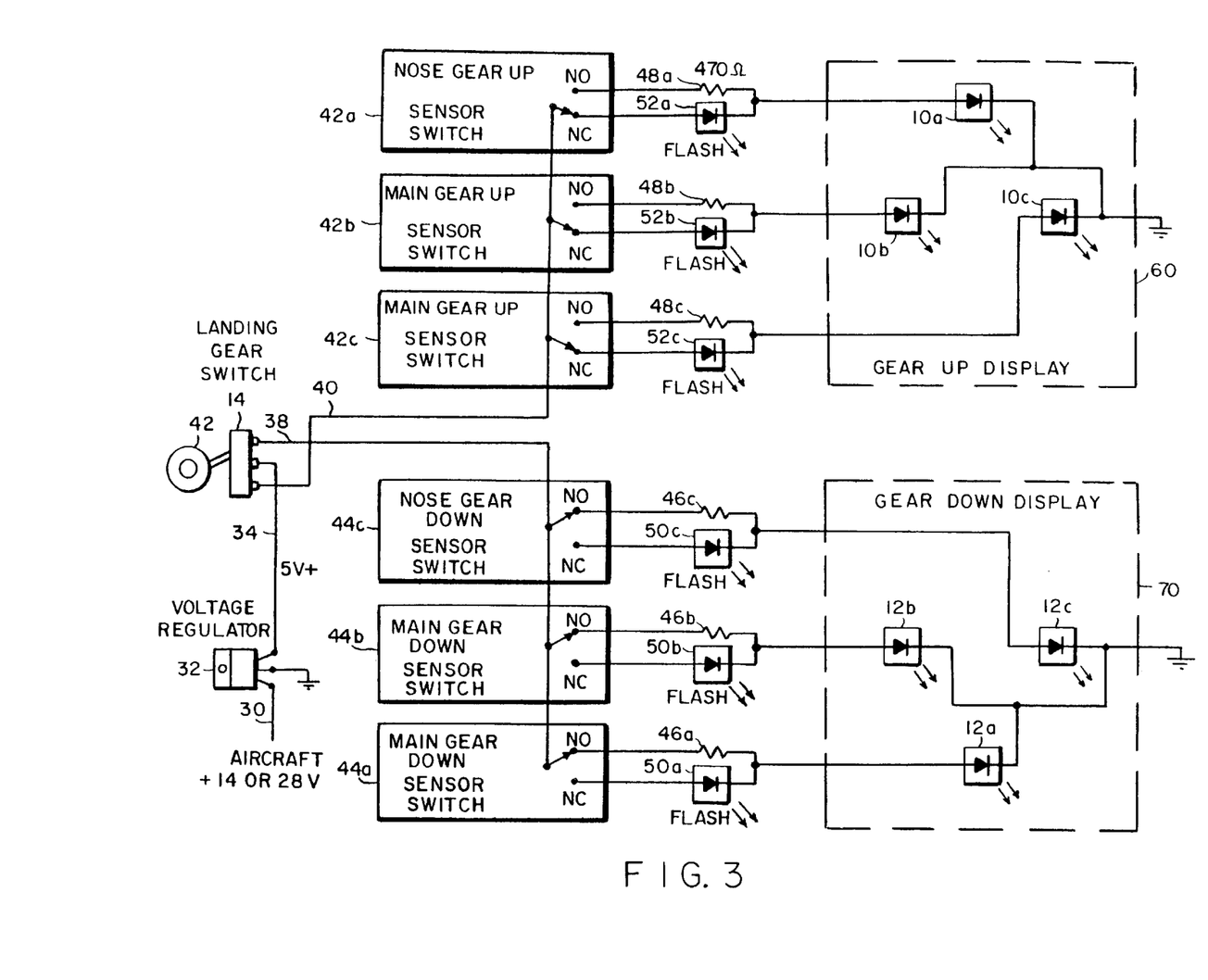
FIG. 3 is a schematic diagram of an embodiment of the present invention.

A schematic for an embodiment of the system is illustrated in FIG. 3. Aircraft bus voltage 30, nominally 14 or 28 volts, is applied to a voltage regulator 32, such as the Panasonic AN7805 model, which steps the voltage down to 5 volts positive 34. (The Panasonic model is manufactured by the parent company of Panasonic, Matsushita Services Co., which is located at 50 Meadowland Parkway, Secaucus, N.J. 07094). This simultaneously puts the voltage at the level needed for the circuit and protects the circuit from the influence of bus voltage fluctuations (of course other bus voltages may be available and persons skilled in the art will recognize that voltage regulator 32 is not necessary to supply power to the system and/or other means such as a battery may be used to supply power to the system). The 5 volt power 34 is connected to a center pole on a landing gear switch 14, in parallel to the connections for the landing gear actuators. Power is supplied to or cut off from either half of the display as the lever 42 is moved to commence gear retraction or extension by making connections to 38 and 40. As shown in FIG. 3, the gear up display 60 has no power and is unlit while the gear down display 70 has voltage and is illuminated.

Current flows from switch 14 to each sensor switch 44a, 44b and 44c, such as the DC2C-A1RB manufactured by Cherry Electrical Products, located at 3600 Sunset Ave., Waukegan, Ill. 60087-3298. In the present example, the power is switched to 470-ohm resistors 46a, 46b and 46c in order to reduce voltage to the operating range of the indicator LEDs 12a, 12b and 12c, and to adjust the brightness of its output. The value of resistors 46a, 46b and 46c may be varied to suit the particular LEDs 12a, 12b and 12c (here illustrated as LTL-327G LEDs) utilized in the display 70. Different cockpit layouts may also require a different level of illumination, as the display must be bright enough to see in daytime, yet not bright enough to be distracting or to mask other displays at night.

If the gear is to be retracted, moving lever 42 on switch 14 extinguishes the gear down display 70. Current 40 flows to the gear up sensor switches 42a, 42b and 42c which are initially in the normally closed (NC) position. This causes power to be applied to the flashing LEDs 52a, 52b and 52c, such as the LTL-4213-FL sold by Lite-on Inc. Each time an LED 52a, 52b or 52c flashes, a pulse of current flows to the corresponding connected indicator LED 10a, 10b and 10c, (here illustrated as LTL-327Y LEDs) causing it to flash sympathetically. When each gear reaches the limit of travel, the arm on the corresponding sensor switch 42a, 42b and 42c is depressed by contact with the gear leg or a moving portion of the retraction linkage. This opens the NC contacts and closes the normally open (NO) contacts, which removes power from the flashing LED 52a, 52b or 52c and applies power to corresponding resistor 48a, 48b or 48c thereby eliminating the pulses and providing a steady current to illuminate the corresponding indicator 10a, 10b or 10c. If any individual gear leg fails to reach its limit and trip its sensor, the associated LED 10a, 10b or 10c will continue to flash and that portion of the display will flash as well; indicating that the gear element, in this case, is not yet fully up. If the display continued to flash for an unusually long time, the pilot would become alerted that something was wrong.

Figure 4:
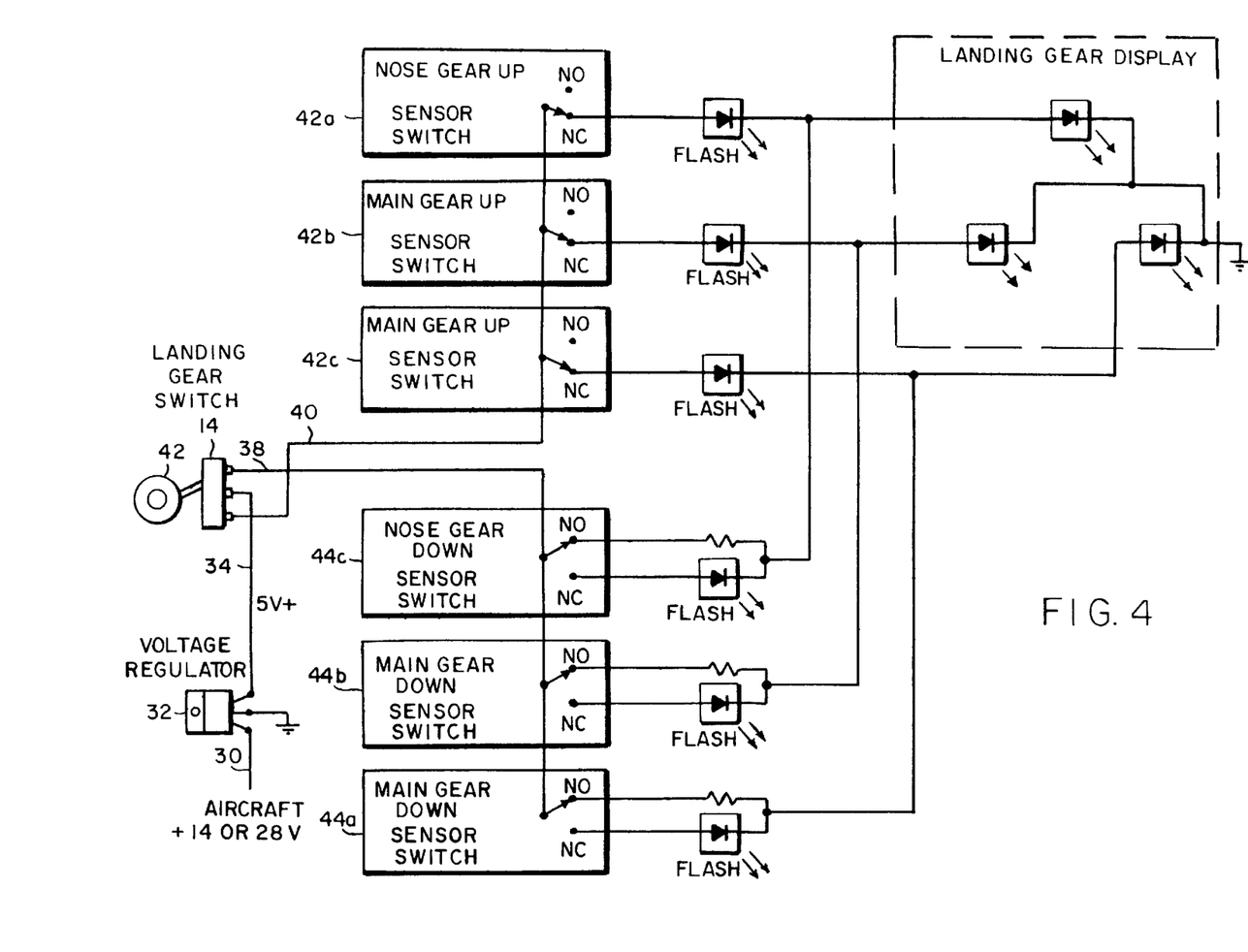
FIG. 4 is a schematic diagram of an embodiment of the present invention.

The system described may also be employed for a conventional two- or three-light display by eliminating one half of the display, as shown in FIG. 4. The resistor would be removed from the gear UP sensor switches, and the NC contact would be unused. Output from the gear UP flashing LED would be connected to the corresponding gear DOWN display LED. The result would be that the display would operate as previously described in the extending and DOWN position. However, when the gear was retracted the indicator lights would flash until each gear reached its limit, at which time the indicator would be extinguished. This would provide the same warning as the full four- or six-LED display, and might be more suitable for retrofitting existing installations. The preferred color for the LEDs in such a display would be green.

Figure 5:
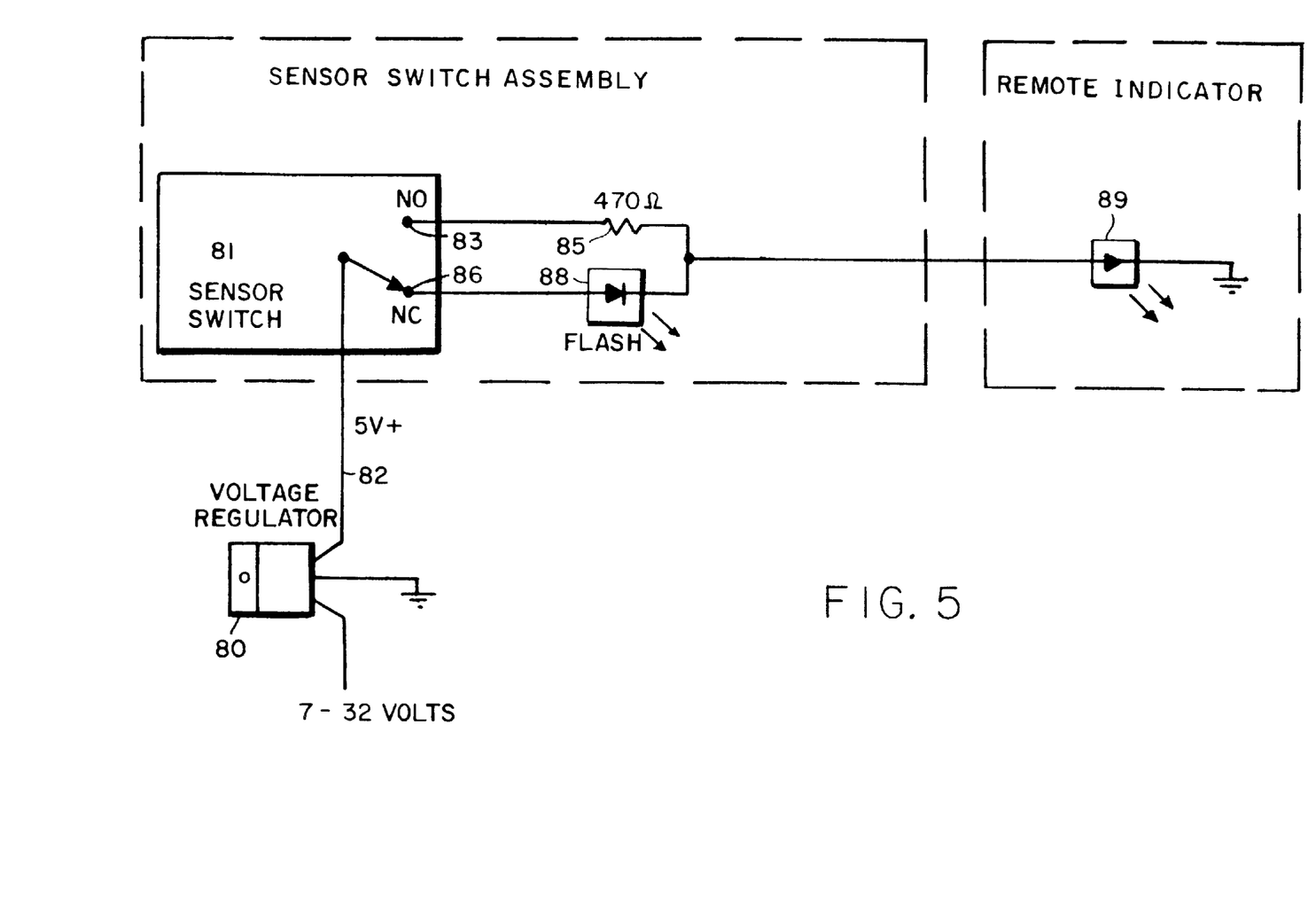
FIG. 5 illustrates an embodiment of a position sensor of the present invention.

FIG. 5 illustrates an embodiment of a position sensor of the present invention. Current flows from power source 80 to sensor switch 81 via a common pole 82. Normally open contact 83 of switch 81 is connected to current limiting means 85, with normally closed contact 86 of switch 81 connected to current interrupting means 88. Current limiting means 85 and current interrupting means 88 are then connected in common to display indicating means 89.

When sensor switch 81 is connected to normally open contact 83, current flows to current limiting means 85. This results in the presence of steady power on display indicating means 89, thereby causing the display to be steadily illuminated.

When sensor switch 81 is connected to normally closed contact 86, current flows to current interrupting means 88. This results in the presence of intermittent power on display indicating means 89, thereby blinking the display indicating means 89.

The sensor switch 81 shown in FIG. 5 may contact a surface of a door, latch or some other mechanical device (not shown). Thus two states of the door (or other mechanical device) may be displayed. By way of example, in a first state the door is closed and in a second state the door is open. In the first state when the door is closed, the door is in contact with the sensor switch thereby causing the display indicating means 89 to indicate steadily. If the door opens and reaches the second state, the sensor switch will connect to the normally closed contact and the display indicating means 89 will illuminate intermittently.

Figure 6A:
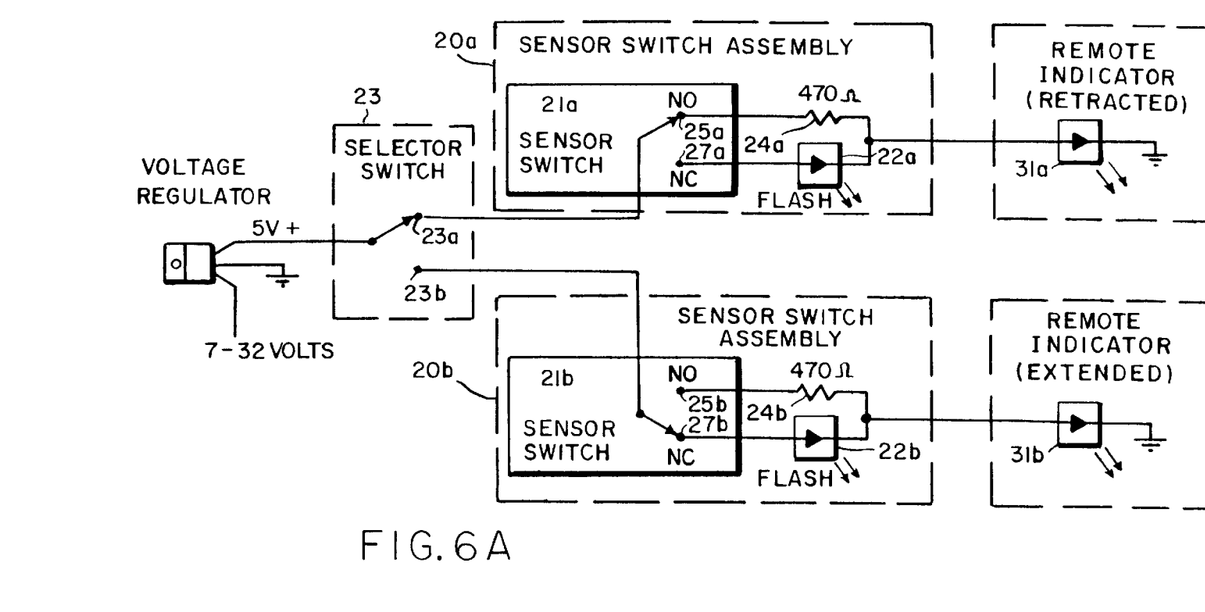
FIG. 6A is a schematic diagram of an embodiment of the present invention.

FIG. 6A is a schematic diagram of an embodiment of the present invention, wherein the status of travel for only one object is indicated. Selector switch 23 has a top pole 23a and a bottom pole 23b, though which current flows. Connection to top pole 23a allows current to flow to sensor switch 21a and connection to the bottom pole 23b allows current to flow to sensor switch 21b.

Actuator arm 26a actuates connection of sensor switch 21a to either the normally open contact 25a or the normally closed contact 27a. When sensor switch 21a is connected to normally open contact 25a, current flows to resistor 24a. This results in the presence of steady power, thereby causing the display LED 31a to be steadily illuminated. When sensor switch 21a is connected to normally closed contact 27a, current flows to flashing LED 22a. This results in the presence of intermittent power, thereby blinking the display LED 31a.

Actuator arm 26b actuates connection of sensor switch 21b to either the normally open contact 25b or the normally closed contact 27b. When sensor switch 21b is connected to normally open contact 25b, current flows to resistor 24b. This results in the presence of steady power, thereby causing the display LED 31b to be steadily illuminated. When sensor switch 21b is connected to normally closed contact 27b, current flows to flashing LED 22b. This results in the presence of intermittent power, thereby blinking the display LED 31b.

Figure 6B:
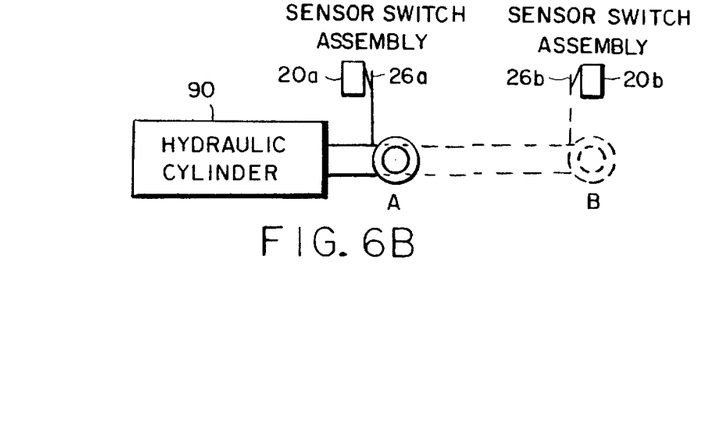
FIG. 6B illustrates a system utilizing the embodiment diagramed in FIG. 6A.

FIG. 6B illustrates a system utilizing the embodiment diagramed in FIG. 6A. When selector switch 23 connects to top pole 23a, power is supplied to sensor switch assembly 20a and power is cut off from sensor switch assembly 20b. When selector switch 23 connects to bottom pole 23b, power is supplied to sensor switch assembly 20b and power is cut off from sensor switch assembly 20a.

Sensor switch assemblies 20a and 20b, both having actuator arms 26a and 26b, respectively, are connected to hydraulic cylinder 90 at points A and B, respectively. When actuator arm 26a is depressed, sensor switch 21a connects to normally open contact 25a, thereby connecting power to resistor 24a. This results in the presence of steady power, thereby causing the display LED 31a to be steadily illuminated. When actuator arm 26a is not depressed, sensor switch 21a connects to normally closed contact 27a, thereby connecting power to flashing LED 22a. This results in the presence of intermittent power, thereby blinking the display LED 31a.

When actuator arm 26b is depressed, sensor switch 21b connects to normally open contact 25b, thereby connecting power to resistor 24b. This results in the presence of steady power, thereby causing display LED 31b to be steadily illuminated. When actuator arm 26b is not depressed, sensor switch 21b connects to normally closed contact 27b, thereby connecting power to flashing LED 22b. This results in the presence of intermittent power, thereby blinking the display LED 31b.

When hydraulic cylinder 90 is located at point A, hydraulic cylinder 90 depresses actuator arm 26a, causing sensor switch 21a to connect to normally open contact 25a. When hydraulic cylinder 90 is not at point A, such as when it is in transit or when it is at point B, actuator arm 26a is not depressed and sensor switch 21a connects to normally closed contact 27a.

When hydraulic cylinder 90 is located at point B, hydraulic cylinder 90 depresses actuator arm 26b, causing sensor switch 21b to connect to normally open contact 25b. When hydraulic cylinder 90 is not at point B, such as when it is in transit or when it is at point A, actuator arm 26b is not depressed and sensor switch 21b connects to the normally closed contact 27b.

Thus, the position of an object is selected by setting selector switch 23 so that it connects to either the top pole 23a or the bottom pole 23b, depending upon the desired position of the object. Movement of selector switch 23, for example, from top pole 23a to bottom pole 23b causes power to be cut off from sensor switch assembly 20a, thereby extinguishing illumination of display LED 31a, and to be supplied to sensor switch assembly 20b, thereby activating illumination of display LED 31b. Display LED 31b flashes, as long as hydraulic cylinder 90 is still located at point A or is in transit, because sensor switch 21b remains connected to normally closed contact 27b. As soon as hydraulic cylinder 90 reaches point B, hydraulic cylinder 90 depresses actuator arm 26b. This causes sensor switch 21b to connect to normally open contact 25b, thereby supplying power to resistor 24b and resulting in steady illumination of display LED 31b. The presence of steady illumination confirms that the object has fully reached the desired position. The presence of flashing illumination indicates that the object has not reached the desired position, i.e., the object could still be at the former position or it could be in transit.

Figure 7A:
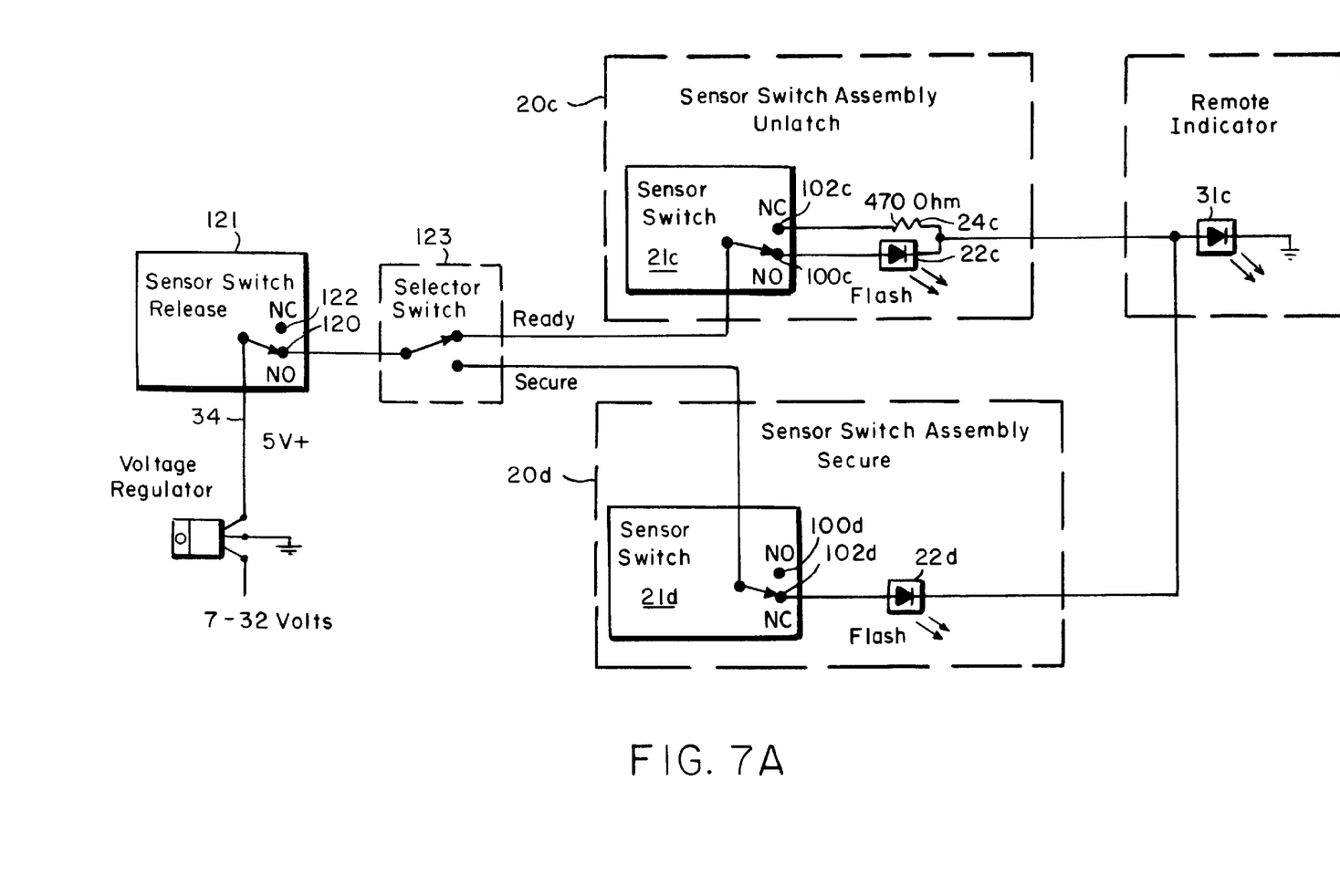
FIG. 7A is a schematic diagram of another embodiment of the present invention.

Shown in FIG. 7A is a further embodiment of the present invention in which the normally closed contacts and the normally open contacts are reversed relative to the embodiment of FIG. 6A. Such a reversal of normally closed contacts and normally open contacts is useful when displaying the status of certain mechanisms such as aircraft ordnance. For example, when a switch to arm aircraft ordnance is activated, the display would indicate steady illumination. Upon successful arming of the ordnance, the display would indicate intermittently. Further, upon transition to de-arming the ordnance, a second light source (or the same light source as shown in FIG. 7A) on the display would indicate steadily and upon successful de-arming of the ordnance the second light source (or the same light source as shown in FIG. 7A) would extinguish.

Figure 7B:
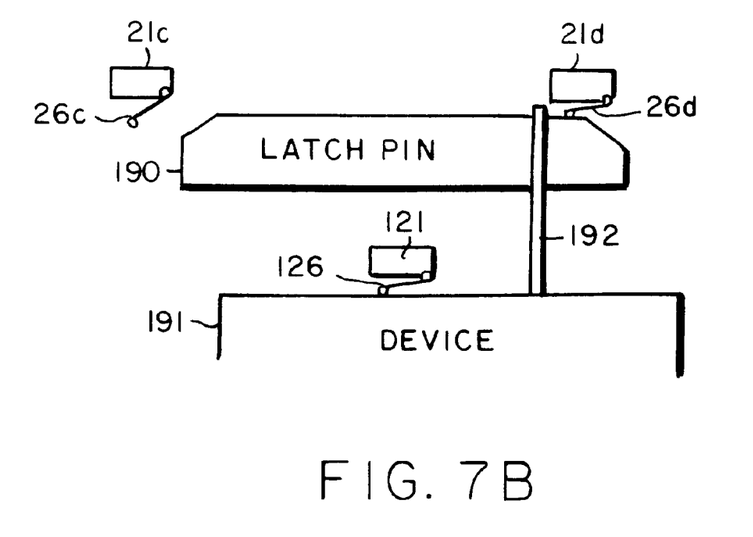
FIG. 7B illustrates a system utilizing the embodiment diagramed in FIG. 7A.
Figure 7C:
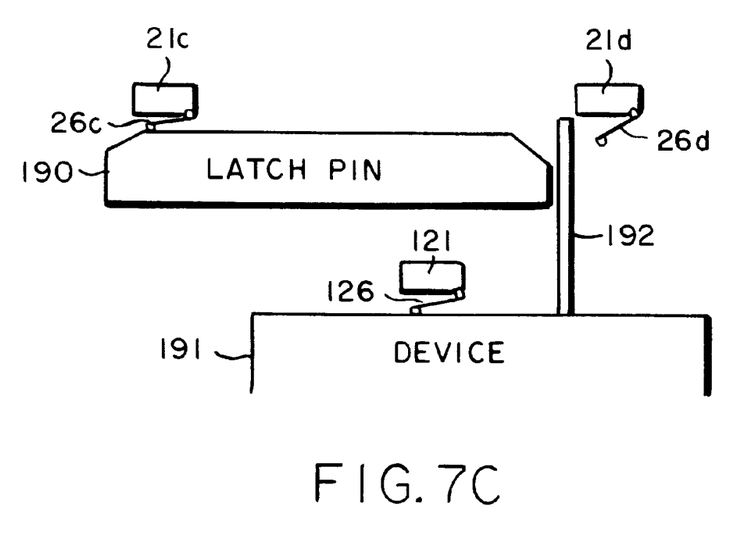
FIG. 7C illustrates a system utilizing the embodiment diagramed in FIG. 7A.

FIGS. 7B and 7C illustrate a system utilizing the schematic diagramed in FIG. 7A. In FIGS. 7B and 7C, mechanical equipment comprising a latch pin 190 and a device 191 are shown. The device 191 includes a bracket 192. The latch pin 190 engages with the bracket 192 to secure device 191. When latch pin 190 disengages from bracket 192, device 191 is no longer secure and may be released. Such an arrangement may be any release/secure mechanism and, for purposes of illustration here, the device 191 is a bomb or other ordnance and the latch pin 190 serves as a safety and activation mechanism. Thus, when the latch pin 190 engages the bracket 192, the device 191 is secured. However, when the latch pin 190 is disengaged from the bracket 192, the device is armed and/or ready to be released.

In the embodiment diagramed in FIG. 7A, there is a single remote indicator which includes display LED 31*c*. The display LED 31*c* connects with two sensor switch assemblies 20*c*, 20*d*. Each sensor switch assembly 20*c*, 20*d* contacts the latch pin 190 (when the latch pin 190 goes through its full range of motion), verifies its positional status (see FIGS. 7B and 7C), and transmits the positional status of the latch pin 190 to the display LED 31*c*. Each sensor switch assembly 20*c*, 20*d* includes a sensor switch 21*c*, 21*d*, an actuator arm 26*c*, 26*d* and a flashing diode 22*c*, 22*d*. Each sensor switch 21*c*, 21*d* has a normally open contact 100*c*, 100*d* and a normally closed contact 102*c*, 102*d*.

A selector switch 123 routes power to either the ready sensor switch assembly 20*c* or to the secure sensor switch assembly 20*d*.

FIG. 7B shows latch pin 190 engaged with bracket 192 to secure device 191. As depicted in FIGS. 7A and 7B, in order to disengage the latch pin 190, the selector switch 123 is put in a ready position to divert power to the ready sensor switch 21*c*. Before the latch pin 190 completely disengages from the bracket 192 and actuates actuator arm 26*c*, the ready sensor switch 20*c* will route power to the normally closed contact 102*c*. The normally closed contact 102*c* is connected to the display LED 31*c* through resistor 24*c*. Thus, while the ready sensor switch 20*c* routes power to the normally closed contact 102*c*, the display LED 31*c* will illuminate steadily to indicate that the device is in a transition state to a ready mode. This also indicates that the latch pin 190 is still engaged with the device.

Once the latch pin 190 completely disengages the bracket 192 (as shown in FIG. 7C) and actuates actuator arm 26*c*, sensor switch 21*c* connects to the normally open contact 100*c*. Power is transmitted from the normally open contact 100*c* to the remote indicator LED 31*c* via a flashing diode 22*c*. The LED 31*c* will illuminate intermittently to indicate that the latch pin 190 is completely disengaged from bracket 192 and device 191 is in the ready mode and ready to be released.

To resecure the device, selector switch 123 is switched to route power to the secure sensor switch 21*d*. The secure sensor switch 21*d* will route power to a normally closed contact 102*d* until the actuator arm 26*d* of the sensor switch 21*d* is actuated by the latch pin 190. While power is routed to the normally closed contact 102*d* and flashing diode 22*d*, LED 31*c* will indicate intermittently.

Upon actuation of the actuator arm 26*d* by the latch pin 190 (as shown in FIG. 7B), the sensor switch 21*d* will route power to a normally open contact 100*d*. The normally open contact 100*d* prevents power from reaching LED 31*c*, and LED 31*c* will not illuminate thereby showing that the device is resecured by latch pin 190.

To indicate that device 191 has been released, sensor switch 121 provides positional data for the device. As described above, when latch pin 190 is disengaged, LED 31*c* illuminates intermittently to show that device 191 is ready to be released. When device 191 is released, an actuator arm 126 of sensor switch 121 will switch power from a normally open contact 120 to a normally closed contact 122. As shown in FIG. 7A, sensor switch 121 is in series with voltage source 34 and selector switch 123. In this embodiment, normally closed contact 122 is not connected to the remote indicator and the indicator LED 31*c* will not illuminate thereby indicating that the device 191 has been released. Otherwise, while the device remains in contact with actuator arm 126 of sensor switch 121, the sensor switch 121 will route power to the normally open contact 120 and to the selector switch 123. In this embodiment and upon releasing a device, power is not restored to the circuit until another device 191 actuates the actuator arm 126 to activate normally open contact 120.

The invention is not limited to the examples described and shown. Various modifications may be made to the examples by one skilled in the art without departing from the scope of the invention. For example, the hydraulic cylinder 90 or latch pin 190 may be part of mechanisms other than landing gear (or an arming mechanism) such as a door or a lever or a cable. Further, the system disclosed hereinabove need not indicate the state and transition state of a hydraulic cylinder, but may be used to indicate the positional state and transition state of any equipment with moving parts.

What is claimed is:

1. An indicator system for displaying a state and a transition state of a mechanism comprising:

a power supply;

a single light source for displaying the state and the transition state;

a sensor switch in contact with the mechanism at the state, the sensor switch having a common contact connected to the power supply, and having a normally closed contact and a normally open contact from which to route power;

a resistor connected between the normally open contact and the light source; and a flashing diode connected between the normally closed contact and the light source, whereby to indicate the state, the mechanism contacts the sensor switch and the sensor switch actuates the normally open contact and causes the light source to indicate steadily, and to indicate the transition state, the sensor switch actuates the normally closed contact and causes the light source to indicate intermittently.

2. The indicator system of claim 1 further comprising a routing switch connected between the power supply and the sensor switch for activating the mechanism and routing power to the common contact of the sensor switch.

3. The indicator system of claim 2 wherein the light source is an LED.

4. A sensor assembly for sensing and selectively indicating two operating states of a mechanism, comprising:

a power supply having a source connection and a return connection;

a switch having a common contact, a normally closed contact and a normally open contact, said power supply source connection connected to said common contact;

current limiting means having a first end and a second end, said first end connected to said normally open contact;

current interrupting means having a first end and a second end, said first end connected to said normally closed contact, said second end connected to said current limiting second end; and a single indicating means having a first end and a second end, said first end connected to said current limiting second end, said second end connected to said power supply return connection, whereby said switch responsive to one of said operating states to cause said indicating means to indicate intermittently when said switch actuates the normally closed contact, and said switch responsive to the other of said operating states to cause said indicating means to indicate steadily when said switch actuates the normally open contact.

5. An indicator system for displaying a state and a transition state of a mechanism comprising:

a power supply;

a single light source for displaying the state and the transition state;

a sensor switch in contact with the mechanism at the state, the sensor switch having a common contact connected to the power supply, and having a normally closed contact and a normally open contact from which to route power from the common contact;

a resistor connected between the normally closed contact and the light source; and a flashing diode connected between the normally open contact and the light source, whereby to indicate the transition state, the sensor switch actuates the normally closed contact and causes the light source to indicate steadily, and to indicate the state, the mechanism contacts the sensor switch and the sensor switch actuates the normally open contact and causes the light source to indicate intermittently.

6. The indicator system of claim 5 further comprising a routing switch connected between the power supply and the sensor switch for activating the mechanism and routing power to the common contact of the sensor switch.

7. The indicator system of claim 6 wherein the light source is an LED.

8. An indicator system for displaying a first transition state, a first state, a second transition state, and a second state of a mechanism comprising:

a power supply;

a routing switch in communication with the power supply adapted to route power between a first connection and a second connection, the first connection corresponding to the first state, and the second connection corresponding to the second state;

a first and a second sensor assembly activated by the mechanism, each sensor assembly comprising a light source;

a sensor switch in contact with the mechanism at either the first or second state, the sensor switch having a common contact, a normally closed contact and a normally open contact;

a resistor connected between the normally closed contact and the light source; and a flashing diode connected between the normally open contact and the light source, whereby the sensor switch causes the light source to indicate steadily when the sensor switch actuates the normally closed contact, and the sensor switch causes the light source to indicate intermittently when the sensor switch actuates the normally open contact;

the first sensor assembly connected to the first connection of the routing switch, and the second sensor assembly connected to the second connection of the routing switch;

whereby the light source of the first sensor assembly indicates steadily when the mechanism is in the first transition state and indicates intermittently when the mechanism is in the first state; and whereby the light source of the second sensor assembly indicates steadily when the mechanism is in the second transition state and indicates intermittently when the mechanism is in the second state.

9. A sensor assembly for indicating position data of a component comprising:

a power supply;

a selector switch electrically connected to the power supply for routing power to a ready pole and a secure pole;

a ready sensor switch assembly electrically connected to the ready pole of the selector switch, the ready sensor switch assembly including a normally open contact for routing power to a first flashing diode and normally closed contact for routing power to a resistor, the normally open contact being activated when a first actuator arm is actuated and the normally closed contact being activated otherwise;

a secure sensor switch assembly electrically connected to the secure pole of the selector switch, the secure sensor switch assembly including a normally open contact for preventing power transmission and a normally closed contact for routing power to a second flashing diode, the normally open contact being activated when a second actuator arm is actuated and the normally closed contact being activated otherwise; and a remote indicator including a light source electrically connected to the first flashing diode, the second flashing diode and the resistor;

whereby the light source indicates steadily, intermittently or not at all depending upon the power routing of the selector switch and the position of the component relative to the first and second actuator arms.

10. The sensor assembly of claim 9 wherein a range of movement of the component includes a first and a second position and the component contacts the first and second actuator arms such that the light source indicates steadily when the component moves towards the first position;

the light source indicates intermittently when the component reaches the first position and actuates the first actuator arm;

the light source indicates intermittently when the component moves towards the second position; and the light source extinguishes when the component reaches the second position and actuates the second actuator arm.

11. The sensor assembly of claim 10 wherein upon reaching the first position the component activates a device and actuates the first actuator arm thereby causing the light source to indicate intermittently.

12. The sensor assembly of claim 11 wherein upon reaching the second position the component secures a device and actuates the second actuator arm thereby causing the light source to not indicate.

13. The sensor assembly of claim 12 further comprising a release sensor switch assembly electrically connected between the power source and the selector switch, the release sensor switch assembly including a normally closed contact for preventing power transmission to the release sensor switch assembly and a normally open contact for routing power to the selector switch, the normally open contact being activated when a third actuator arm is actuated by the component and the normally closed contact being activated otherwise.

14. The sensor assembly of claim 13 wherein the release sensor switch causes the light source not to indicate when the third actuator arm is not actuated by the component.

15. The sensor assembly of claim 14 wherein the light source is an LED.

* * * * *